April 24, 1934.    L. MYERS    1,956,224
LADLE
Filed April 22, 1933    2 Sheets-Sheet 1
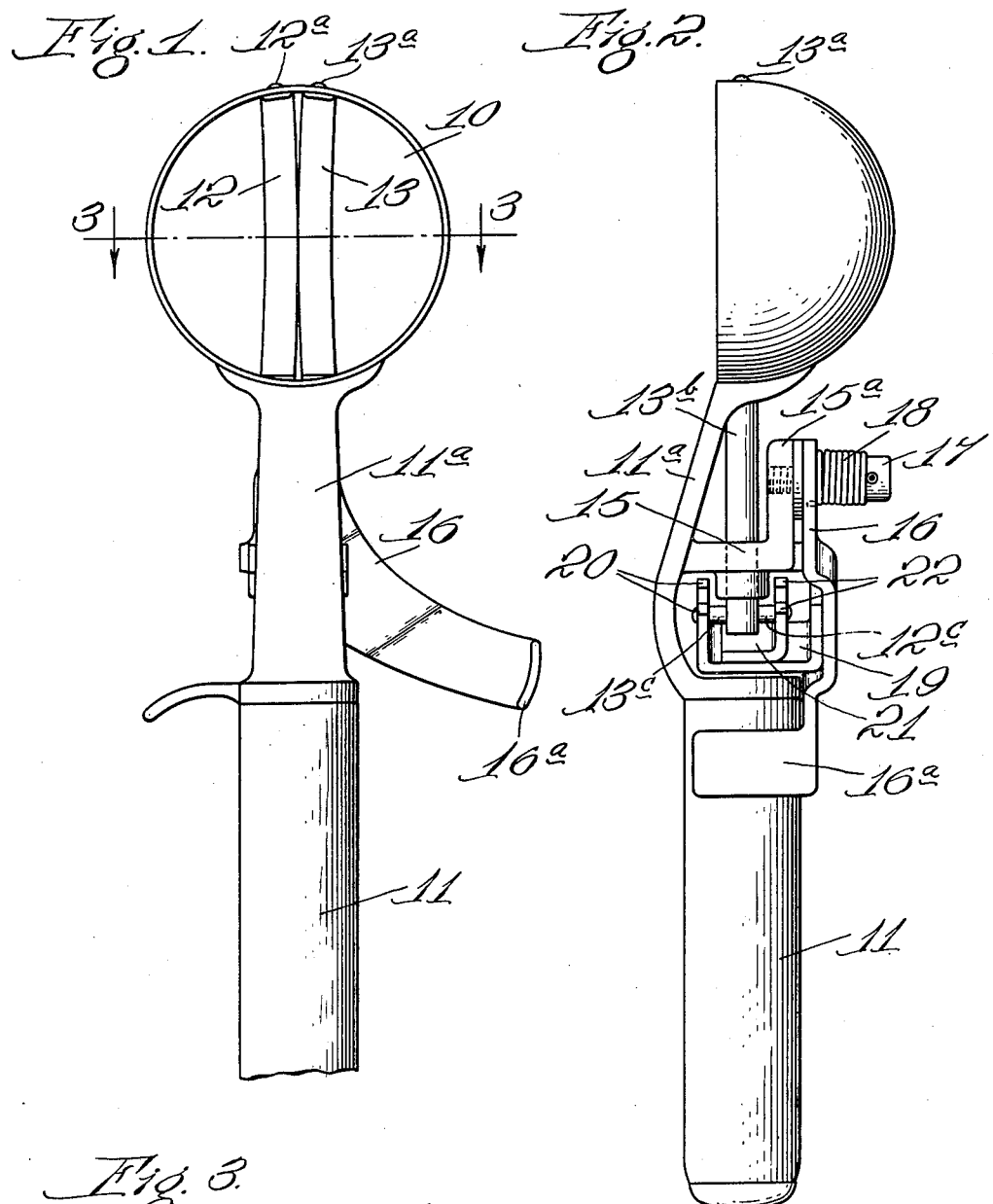
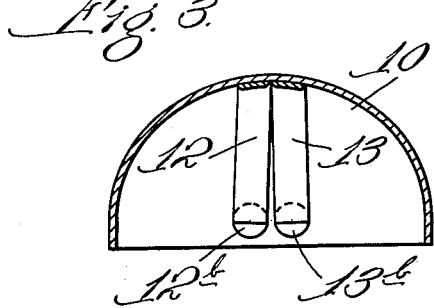

April 24, 1934.　　　　L. MYERS　　　　1,956,224
LADLE
Filed April 22, 1933　　2 Sheets-Sheet 2
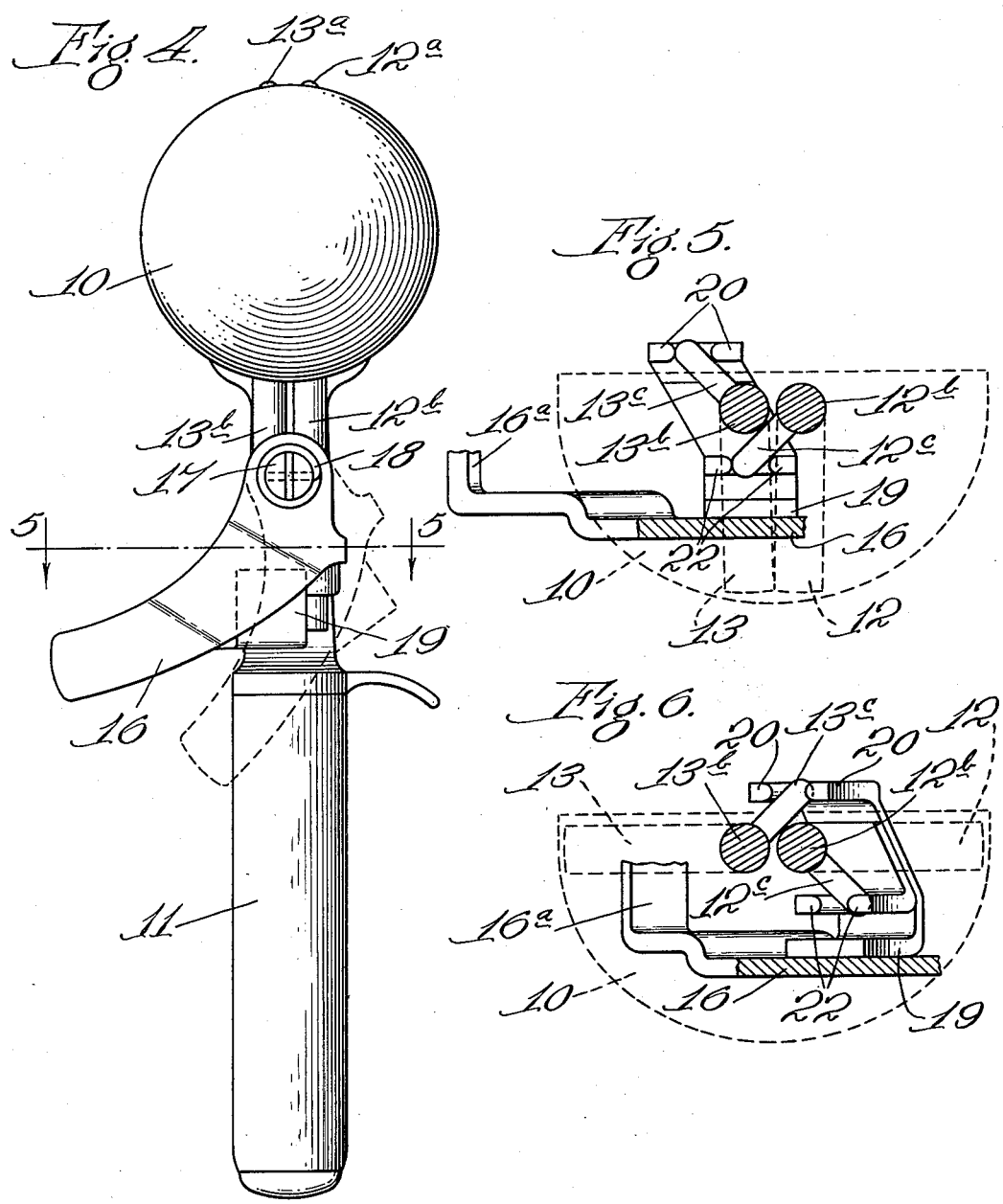

Patented Apr. 24, 1934

1,956,224

UNITED STATES PATENT OFFICE 1,956,224

LADLE

Louis Myers, Chicago, Ill.

Application April 22, 1933, Serial No. 667,427

4 Claims. (Cl. 107—48)

This invention relates to improvements in ladles and, more especially, a self-emptying ladle of a type frequently used for dispensing ice-creams and similar semi-solid substances.

Among the features of my invention is the provision of such a device with two scrapers or knives.

Another feature of my invention is the provision of a ladle of the character described that can be easily and cheaply made and which is simple, efficient and durable in construction and operation.

Other features and advantages of my invention will appear more fully as I proceed with my specification.

In that form of device embodying the features of my invention shown in the accompanying drawings—

Figure 1 is a top plan view; Fig. 2 is a view in side elevation; Fig. 3 is a view taken as indicated by the line 3 of Fig. 1; Fig. 4 is a bottom plan view; Fig. 5 is a view taken as indicated by the line 5 of Fig. 4; and Fig. 6 is a view similar to Fig. 5 showing the parts in an altered position.

As shown in the drawings, the device includes a hemispherical bowl 10 and handle 11. The handle is connected to the bowl 10 by the member 11a which may be considered either as a part of the handle or as a separate bridging member.

Inside of the bowl 10 are two semi-circular scrapers or knives 12 and 13, each adapted for a 90° swinging movement. The ends of these knives are provided with projections 12a and 13a, respectively, finding bearings in holes near the margin of the bowl 10.

The knife 13 has attached to it an operating shaft 13b and the knife 12 is likewise provided with an operating shaft 12b. The shafts 12b and 13b carry pins 12c and 13c, respectively, near their ends, which are used for imparting rotation to the same. These shafts 12b and 13b have bearings in the bearing member 15 carried by the member 11a.

The bearing member 15 carries a base 15a upon which is pivotally mounted the manually-operated lever 16 used for imparting rotation to the shafts 12b and 13b. This lever is pivotally mounted on the pin 17 which also carries the usual spiral spring 18 for returning the parts to their normal position. The end of the lever 16 is provided with a finger portion 16a adapted to be engaged by the thumb of the hand that grasps the handle 11.

The connection between the operating lever 16 and the pins 12c and 13c on the knife-operating shafts is effected in the following manner. The lever 16 carries the U-shaped member or yoke 19, the outer end of which is forked or bifurcated, as indicated by 20, 20, to embrace the end of the pin 13c. There is an oppositely arranged L-shaped member 21 mounted on the member 19, the end of which is likewise bifurcated or forked, as indicated by 22, 22, the prongs 22, 22 engaging the pin 12c. Swinging of the lever 16 on the pivot pin 17 causes rocking of the shafts 12b and 13b through 90° from the position shown in Fig. 5 to the position shown in Fig. 6. This rotates each of the scrapers 12 and 13 90° to scrape one-half of the bowl 10.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A ladle of the character described, including; a bowl; a handle attached to the bowl; a pair of scrapers swingably mounted in the bowl, each adapted for 90° swinging movement; an operating shaft attached to each scraper, said shafts lying side by side and parallel to each other; and means for simultaneously imparting 90° rotation to each of the scraper shafts.

2. A device as claimed in claim 1, in which the scraper shafts are rotatably mounted in a bearing carried by the handle.

3. A device as claimed in claim 1, in which the scraper shafts are rotatably mounted in a bearing carried by the handle and in which each shaft is provided with a pin and in which the rotation of the shaft is imparted by means engaging said pins.

4. A ladle of the character described, including; a bowl; a handle attached to the bowl; a pair of scrapers swingably mounted in the bowl, each adapted for 90° swinging movement; an operating shaft attached to each scraper, said operating shafts lying side by side and parallel to each other; a radial pin carried by each shaft; an operating lever pivotally carried by the handle; and connections between said operating lever and said pins whereby swinging movement of said operating lever operates on said pins to rotate said shafts.

LOUIS MYERS.